United States Patent
Ozawa et al.

(10) Patent No.: US 6,758,515 B2
(45) Date of Patent: Jul. 6, 2004

(54) FRONT END STRUCTURE OF VEHICLE WITH CRUSHABLE ZONES FOR COLLISION DAMAGE

(75) Inventors: Ikuo Ozawa, Toyoake (JP); Toshiki Sugiyama, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/374,129

(22) Filed: Feb. 25, 2003

(65) Prior Publication Data

US 2003/0168886 A1 Sep. 11, 2003

(30) Foreign Application Priority Data

Feb. 26, 2002 (JP) ........................................ 2002-049972

(51) Int. Cl.[7] .............................................. B60R 27/00
(52) U.S. Cl. .............................. 296/187.09; 296/193.1; 293/115; 180/68.4
(58) Field of Search ...................... 296/187.09, 187.02, 296/187.1, 197, 203.02, 193.09, 193.1, 194; 293/115, 133, 1, 136; 180/68.4, 68.6

(56) References Cited

U.S. PATENT DOCUMENTS

| | | | | |
|---|---|---|---|---|
| 3,412,628 A | * | 11/1968 | De Gain | .................... 293/133 |
| 4,413,856 A | * | 11/1983 | McMahan et al. | .......... 296/189 |
| 5,271,473 A | * | 12/1993 | Ikeda et al. | .................. 296/194 |
| 5,358,304 A | * | 10/1994 | Kanemitsu et al. | .... 296/193.09 |
| 6,216,810 B1 | * | 4/2001 | Nakai et al. | ................. 296/194 |
| 2001/0045761 A1 | * | 11/2001 | Ozawa et al. | ................. 296/194 |
| 2002/0043820 A1 | * | 4/2002 | Brogly et al. | ................ 296/194 |
| 2002/0063433 A1 | * | 5/2002 | Gotanda et al. | ............. 293/133 |
| 2002/0190542 A1 | * | 12/2002 | Takeuchi et al. | ............. 296/194 |

FOREIGN PATENT DOCUMENTS

| | | |
|---|---|---|
| JP | 10-264856 | 10/1998 |
| JP | 3328893 | 7/2002 |

* cited by examiner

Primary Examiner—Lori L. Coletta
(74) Attorney, Agent, or Firm—Harness, Dickey & Pierce, PLC

(57) ABSTRACT

A front end panel (10) is fixed to side members (50) behind crushable zones (51). Due to this structure, most of the impact forces are absorbed by the deformation of a bumper reinforcement (60) and the crushable zones (51) and large impact forces are not transferred to the front end panel (10). Therefore, it is possible to prevent the front end panel (10) from being seriously damaged by impact forces produced in collision while preventing increases in both the number of parts and the man-hours required in assembling the front end structure and an increase in the repair costs for the front end panel because brackets, which are additional parts, can be discarded and, as a matter of course, notches to be provided to the brackets can be dispensed with.

3 Claims, 3 Drawing Sheets

FRONT END STRUCTURE OF VEHICLE WITH CRUSHABLE ZONES FOR COLLISION DAMAGE

BACKGROUND OF THE INVENTION

1. Field of the Invention

The present invention relates to a front end structure of a vehicle.

2. Description of the Related Art

FIG. 4 is a top plan view of a general front end structure. A front end panel 10, to which parts such as a radiator 20 and a condenser 30, to be mounted at the front end of a vehicle, are fixed, is fixed together with a bumper reinforcement 60 to a vehicle body at the top ends of side members 50 extending in the longitudinal direction of the vehicle at the side of the vehicle by using fixing means such as bolts.

However, in the structure shown in FIG. 4, there is a strong possibility that the fixing parts of the front end panel 10 fixed and sandwiched between the side members 50 and the bumper reinforcement 60 will be broken and damaged, because an impact force exerted to the bumper reinforcement 60 in a collision is transferred to the side members 50 and the impact force is absorbed by the deformation of the bumper reinforcement 60 as well as the side members 50.

Contrary to this, in the invention disclosed in Japanese Unexamined Patent Publication (Kokai) No. 10-264856, a front end panel is fixed to side members behind the top ends thereof via brackets, which are parts distinct from the front end panel.

Moreover, as the bracket is provided with a notch so as to easily break, there is a strong possibility that the bracket will be broken, even though the front end panel is not broken, resulting in an increase in the repair costs for the front end panel.

SUMMARY OF THE INVENTION

The above-mentioned problems being taken into account, the objective of the present invention is to prevent the front end panel from being seriously damaged by impact forces produced in collision while preventing increases in both the number of parts and the man-hours required in assembling the front end structure and an increase in the repair costs for the front end panel.

In order to achieve the above-mentioned objective, the first aspect of the present invention relates to a front end structure, of a vehicle, which comprises a front end panel (10) having an integrated radiator (20) and being fixed to a vehicle body at the front end of the vehicle; wherein the front end panel (10) is fixed to the vehicle body behind crushable zones (51) that will preferentially crush before other parts when an impact force not less than a fixed value is applied to the vehicle body.

Due to this structure, it is possible to prevent the front end panel (10) from being seriously damaged by impact forces produced in collision because most of the impact forces are absorbed by the deformation of the crushable zones (51) and large impact forces are not transferred to the front end panel (10). Moreover, as it is possible to prevent the state, as shown in the above-mentioned Japanese Unexamined Patent Publication (Kokai) No. 10-264856, that the fixing parts of the front end panel fixed to the body are damaged an increase in the repair costs for the front end panel can be prevented.

The second aspect of the present invention relates to a front end structure of a vehicle, which comprises a front end panel (10) having an integrated radiator (20) and fixed to a vehicle body at the front end of the vehicle; wherein the front end panel (10) is fixed to side members (50) behind crushable zones (51) that will preferentially crush before other parts when an impact force not less than a fixed value is applied to the side members (50) extending in the longitudinal direction of the vehicle.

Due to this structure, it is possible to prevent the front end panel (10) from being seriously damaged by impact forces produced in collision while preventing increases in both the number of parts and man-hours required in assembling the front end structure and an increase in the repair costs for the front end panel, because: most of the impact forces are absorbed by the deformation of the crushable zones (51); large impact forces are not transferred to the front end panel (10); and brackets, which are additional parts, can be discarded and, as a matter of course, notches to be provided to the brackets can be dispensed with.

In the third aspect of the present invention, the front end panel (10) is fixed to the side members (50) at upper surfaces (50a), which are substantially parallel to the longitudinal direction of the vehicle.

Due to this structure, it is possible to prevent the front end panel (10) from being damaged because the force, among the impact forces applying to the front end panel (10), which is applied perpendicularly to the front end panel (10) can be decreased.

The symbols within the brackets attached to components mentioned above show an example of the relationship of correspondence with concrete components in embodiments that will be described later.

The present invention may be more fully understood from the description of the preferred embodiments of the invention set forth below, together with the accompanying drawings.

DESCRIPTION OF THE PREFERRED EMBODIMENTS

Figure 1:
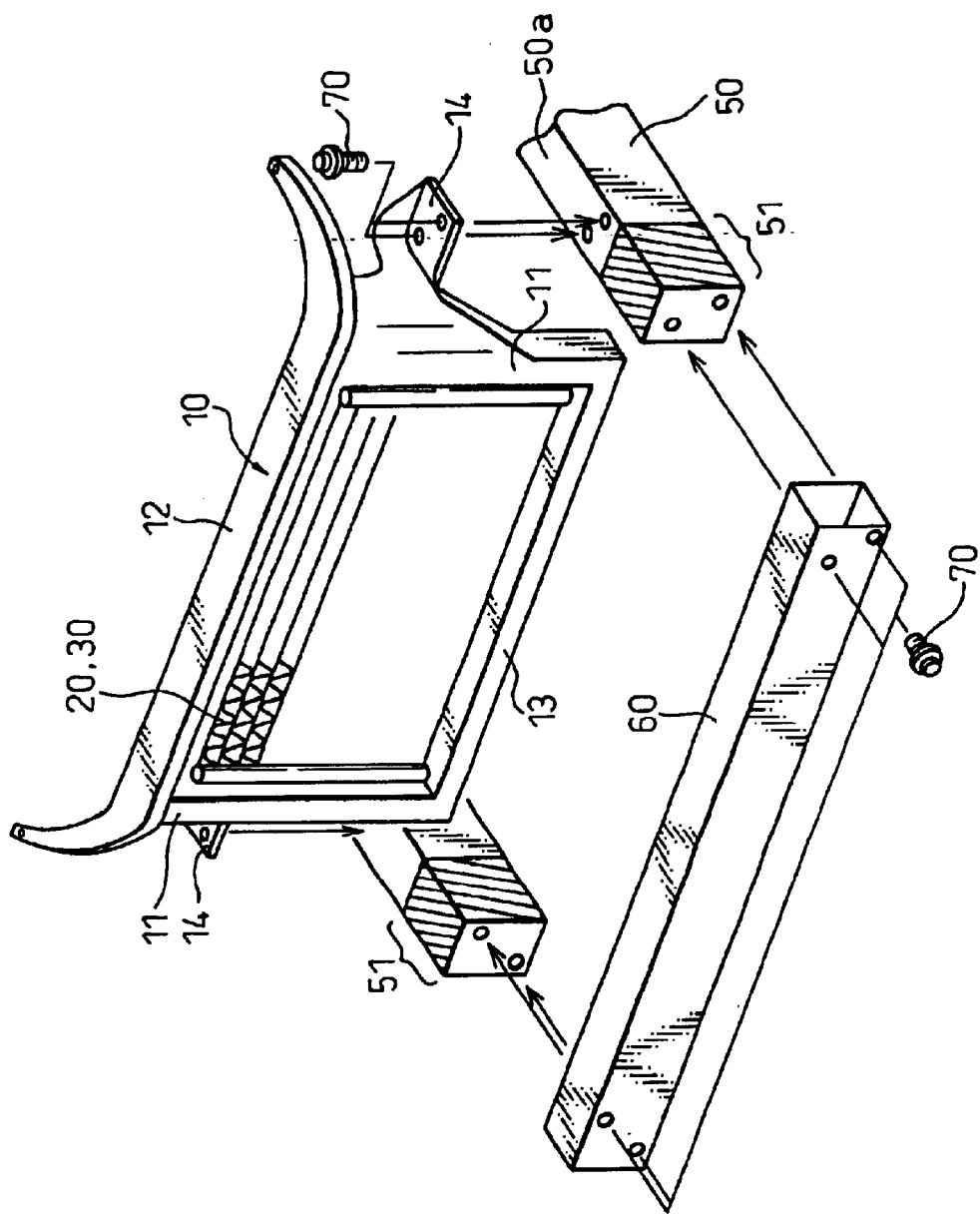
FIG. 1 is an exploded perspective view of the front end of a vehicle that shows a front end structure in an embodiment of the present invention.
Figure 2:
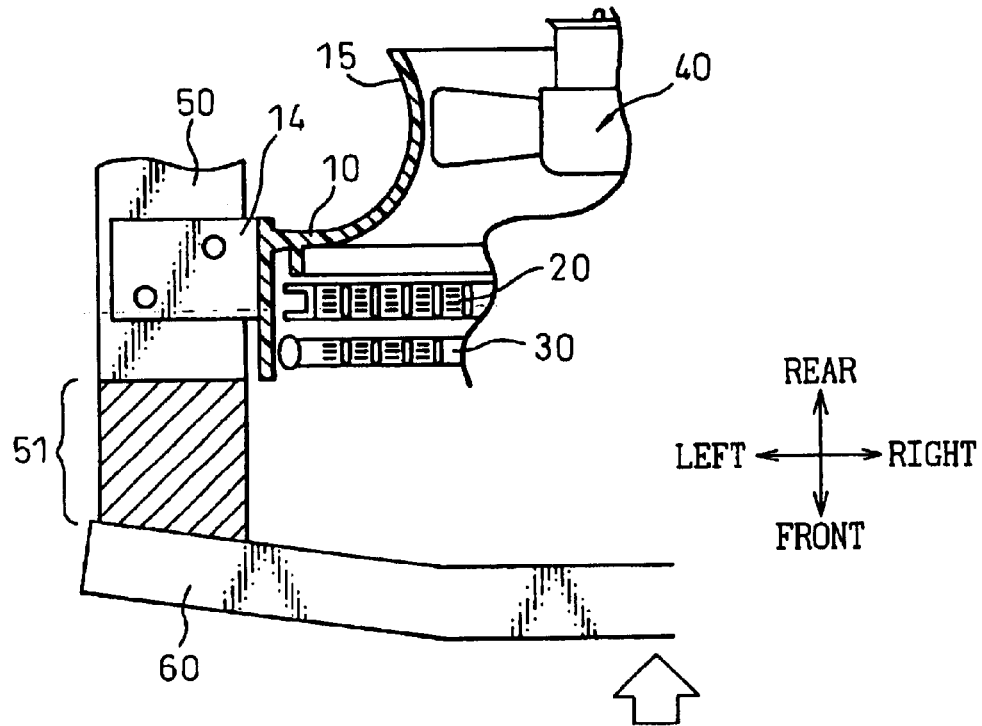
FIG. 2 is a schematic view that shows a fixing part of a front end panel and a side member in the embodiment of the present invention.

FIG. 1 is an exploded perspective view of a front end of a vehicle that shows a front end structure in the present embodiment, and FIG. 2 is a schematic diagram that shows a fixing part of a front end panel 10 and a side member 50.

As shown in FIG. 1, the front end panel 10 is formed into an substantially rectangular frame-like structure, comprising pillars 11 that extend vertically, an upper beam 12 that extends horizontally and is integrated with the top ends of the pillars 11, and a lower beam 13 that extends horizontally and is integrated with the bottom ends of the pillars 11.

Although, in the present embodiment, the pillars 11 and the upper and lower beams 12 and 13 are molded integrally by using a resin, the mechanical strength of which has been reinforced by carbon fibers or glass fibers, it is also possible, needless to say, to mold integrally by metal casting such as an aluminum die casting, or to integrate the pillars 11 and the upper and lower beams 12 and 13, which have been separately manufactured, by welding, securing with bolts, or the like.

Panel fixing sections 14 to fix the front end panel 10 to the side members 50 of the vehicle body, extending in the longitudinal direction of the vehicle, are molded integrally with the pillars 11 and each panel fixing section 14, that is, the front end panel 10, is fixed to the side members 50 at upper surfaces 50a, which are substantially parallel to the longitudinal direction of the vehicle and located behind crushable zones 51 that will preferentially crush before other parts when an impact force not less than a fixed value is applied, by fixing means such as bolts 70.

The impact force not less than the fixed value, which is mentioned above, is a force produced in a condition such that a vehicle traveling at around 10 km/h collides with something.

A bumper reinforcement 60 is a beam-shaped strength member extending in the width direction of a vehicle at the front end of the vehicle and is fixed to the side members 50 at the front ends thereof, that is, the crushable zones 51, by using the bolts 70.

To the front end panel 10, as shown in FIG. 2, a radiator 20 that cools engine cooling water by air and a condenser 30 of an air conditioner are fixed and, at the same time, a shroud 15, which supports a fan 40 sending cooling air to the radiator 20 and the condenser 30 and prevents air sent from the fan 40 from skirting round the radiator 20 and the condenser 30, is integrated with the front end panel 10.

Next, the functions and effects of the present embodiment will be described below.

An impact force applied to the bumper reinforcement 60 in a collision is absorbed by the deformation of the bumper reinforcement 60 and the crushable zones 51.

In this case, as the front end panel 10 is fixed to the vehicle body behind the crushable zones 51 in the present embodiment, most of the impact forces are absorbed by the deformation of the bumper reinforcement 60 and the crushable zones 51 and a large impact force is not transferred to the front end panel 10.

Therefore, it is possible to prevent the front end panel 10 from being seriously damaged by impact forces produced in collision while preventing an increase in both the number of parts and the man-hours required in assembling the front end structure and an increase in the repair costs for the front end panel because the brackets, which are additional parts, can be discarded and, as a matter of course, notches to be provided to the brackets can be dispensed with.

Figure 3:
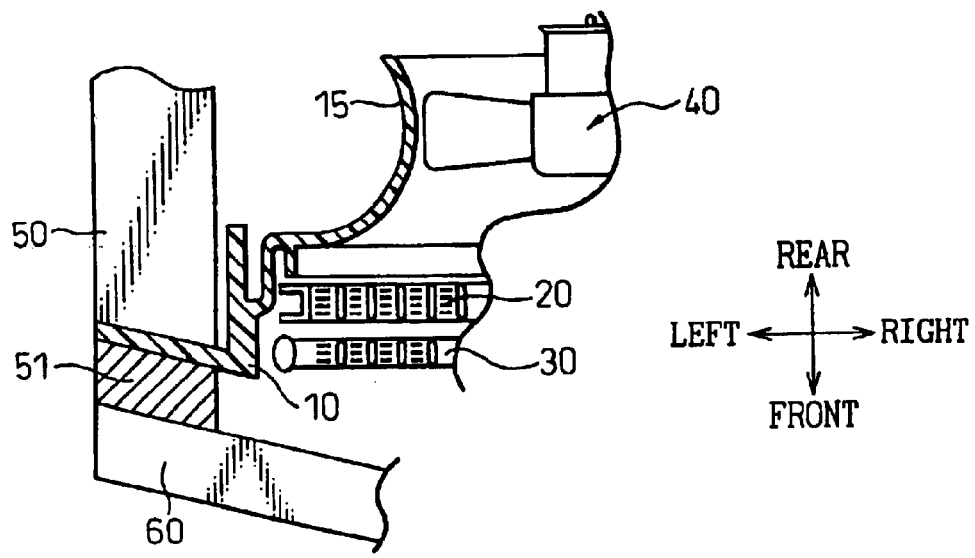
FIG. 3 is a schematic view that shows a fixing part of a front end panel and a side member in another embodiment of the present invention.
Figure 4:
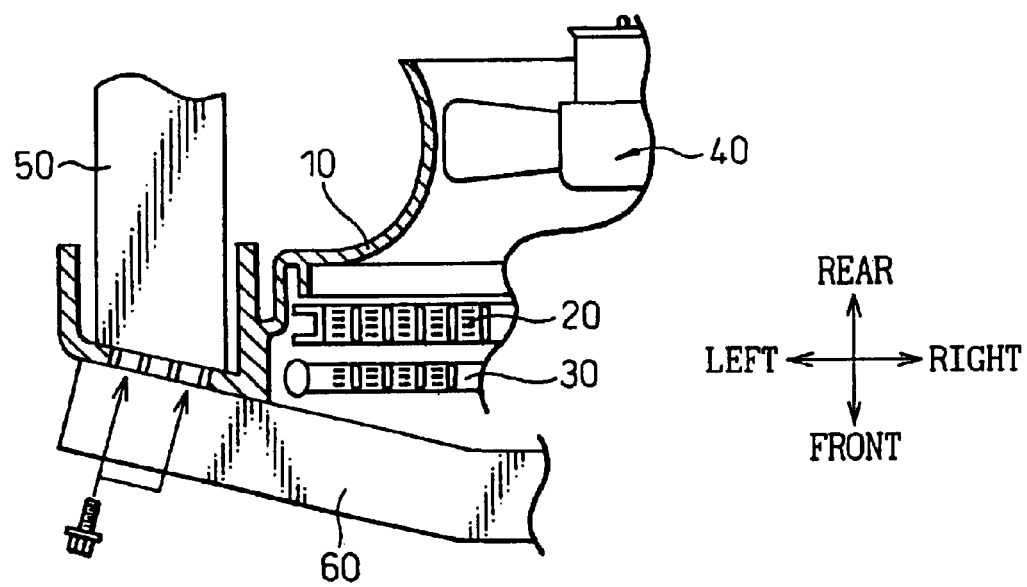
FIG. 4 is a schematic view that shows a fixing part of a front end panel and a side member in a prior art.

If the front end panel 10 is fixed to the vehicle body in such a way as to be interposed between the crushable zone 51 and the side member 50, which are separates parts, as shown in FIG. 3, there is a possibility that most of the impact forces are transferred to the front end panel 10 even though the front end panel 10 is fixed to the vehicle body behind the crushable zone 51.

In the present embodiment, however, the front end panel 10 is fixed to the side members 50 at the upper surfaces 50a, which are located behind the crushable zones 51 and are substantially parallel to the longitudinal direction of a vehicle, that is, the direction of a collision, therefore, the force, among the impact forces applying to the front end panel 10, which is perpendicularly applied to the front end panel 10 is decreased and the front end panel 10 can be prevented from being damaged.

Other Embodiments

In the above-mentioned embodiment, the front end panel 10 is fixed to the side members 50 at the upper surfaces 50a, which are substantially parallel to the longitudinal direction of a vehicle, but the present invention is not limited to this case and the front end panel 10, for example, may be fixed to the sides or bottoms of the side members 50.

Although the front end panel 10 is fixed to the side members 50 at the upper surfaces 50a, which are substantially parallel to the longitudinal direction of a vehicle, the present invention is not limited to this case and the front end panel 10 may be fixed to the side members 50 in such a way that the front end panel 10 is interposed between the crushable zone 51 and the side member 50, as shown in FIG. 3.

In the above-mentioned embodiment, the shroud 15 is integrated with the front end panel 10, but the present invention is not limited to this case and they can be separated.

Moreover, it is needless to say that the panel fixing sections 14 may be separated from the front end panel 10 because the front end panel 10 is fixed to the vehicle body behind the crushable zones 51 in the present invention.

While the invention has been described by reference to specific embodiments chosen for the purposes of illustration, it should be apparent that numerous modifications could be made thereto by those skilled in the art without departing from the basic concept and scope of the invention.

What is claimed is:

1. A front end structure of a vehicle comprising:
   a front end panel being fixed to a vehicle body at the front end of the vehicle and having an integrated radiator;
   wherein the front end panel is fixed to side members behind crushable zones, which will preferentially crush before other parts when an impact force not less than a fixed value is applied, of the side members extending in the longitudinal direction of the vehicle; and
   wherein the front end panel is directly attached to the vehicle body and is secured to substantially horizontal surfaces of the side members.

2. A front end structure of a vehicle, as set forth in claim 1, wherein the front end panel is fixed to the side members at surfaces, which are substantially parallel to the longitudinal direction of the vehicle.

3. A front end structure of a vehicle as set forth in claim 1, wherein the radiator is integrated within the front end panel so that the radiator is located behind the crushable zones.

* * * * *